US007220447B2

United States Patent
Fukushima et al.

(10) Patent No.: US 7,220,447 B2
(45) Date of Patent: *May 22, 2007

(54) MAGNETIC RECORDING MEDIUM, PROCESS FOR PRODUCING THE SAME, AND MAGNETIC RECORDING AND REPRODUCING APPARATUS

(75) Inventors: Masato Fukushima, Chiba (JP); Ryuji Sakaguchi, Chiba (JP); Yukihisa Matsumura, Chiba (JP)

(73) Assignee: Showa Denko K.K., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/953,572

(22) Filed: Sep. 30, 2004

(65) Prior Publication Data

US 2005/0121839 A1    Jun. 9, 2005

Related U.S. Application Data

(62) Division of application No. 09/949,798, filed on Sep. 12, 2001, now Pat. No. 6,821,653.

(30) Foreign Application Priority Data

Sep. 12, 2000   (JP) .......................... P2000-275757

(51) Int. Cl.
*B05D 5/12* (2006.01)
*G11B 5/706* (2006.01)

(52) U.S. Cl. .................. 427/129; 427/131; 428/848.3

(58) Field of Classification Search ............... 427/129, 427/130, 131, 132; 360/135, 136; 369/278; 451/28, 41; 65/60.2, 60.4, 174; 428/410, 428/835.8, 836.2, 848.1, 847.7, 848.3, 827, 428/846.2
See application file for complete search history.

(56) References Cited

U.S. PATENT DOCUMENTS 5,143,794 A    9/1992   Suzuki et al.

(Continued)

FOREIGN PATENT DOCUMENTS

EP    1 074 523 A2    2/2001

(Continued)

OTHER PUBLICATIONS

Patent Abstracts of Japan, abstracting JP-A-9-77531 of Mar. 25, 1997.

(Continued)

*Primary Examiner*—Carol Chaney
*Assistant Examiner*—Louis de Falasco
(74) *Attorney, Agent, or Firm*—Sughrue Mion, PLLC

(57) ABSTRACT

A process for producing a magnetic recording medium, which process comprises a texturing step for forming texture grooves having a line density of 7,500 lines/mm or more on the surface of a non-metallic substrate, and a step for forming an orientation-determining film, a non-magnetic undercoat layer, and a magnetic layer on the non-metallic substrate.

4 Claims, 3 Drawing Sheets

U.S. PATENT DOCUMENTS

| | | |
|---|---|---|
| 5,188,747 A | 2/1993 | Kai et al. |
| 5,476,821 A | 12/1995 | Beall et al. |
| 5,561,089 A | 10/1996 | Ishizaki |
| 5,569,518 A | 10/1996 | Hayashi |
| 5,582,897 A | 12/1996 | Kaneko et al. |
| 5,681,635 A | 10/1997 | Nelson et al. |
| 5,750,230 A | 5/1998 | Ishikawa et al. |
| 5,766,718 A | 6/1998 | Matsuda et al. |
| 6,010,795 A | 1/2000 | Chen et al. |
| 6,139,981 A | 10/2000 | Chuang et al. |
| 6,146,754 A | 11/2000 | Song et al. |
| 6,153,297 A | 11/2000 | Takahashi |
| 6,156,404 A | 12/2000 | Ross et al. |
| 6,248,395 B1 * | 6/2001 | Homola et al. ............. 427/129 |
| 6,316,062 B1 | 11/2001 | Sakaguchi et al. |
| 6,329,309 B1 | 12/2001 | Kanamaru et al. |
| 6,413,608 B1 * | 7/2002 | Bian et al. ................. 428/840 |
| 6,426,311 B1 | 7/2002 | Goto et al. |
| 6,503,600 B2 | 1/2003 | Watanabe et al. |
| 6,544,599 B1 | 4/2003 | Brown et al. |
| 6,544,667 B1 * | 4/2003 | Hosoe et al. ............... 428/831 |
| 6,562,488 B1 | 5/2003 | Chen et al. |
| 6,583,958 B1 * | 6/2003 | Suzuki et al. ............... 360/135 |
| 6,641,465 B2 | 11/2003 | Miyamoto |
| 6,942,933 B2 * | 9/2005 | Osawa ....................... 428/827 |
| 2002/0164505 A1 | 11/2002 | Yokoyama et al. |

FOREIGN PATENT DOCUMENTS

| | | |
|---|---|---|
| JP | 9-77531 A | 3/1997 |
| JP | 2000-119042 A | 4/2000 |

OTHER PUBLICATIONS

Patent Abstracts of Japan, abstracting JP-A-2000-119042 of Apr. 25, 2000.

* cited by examiner

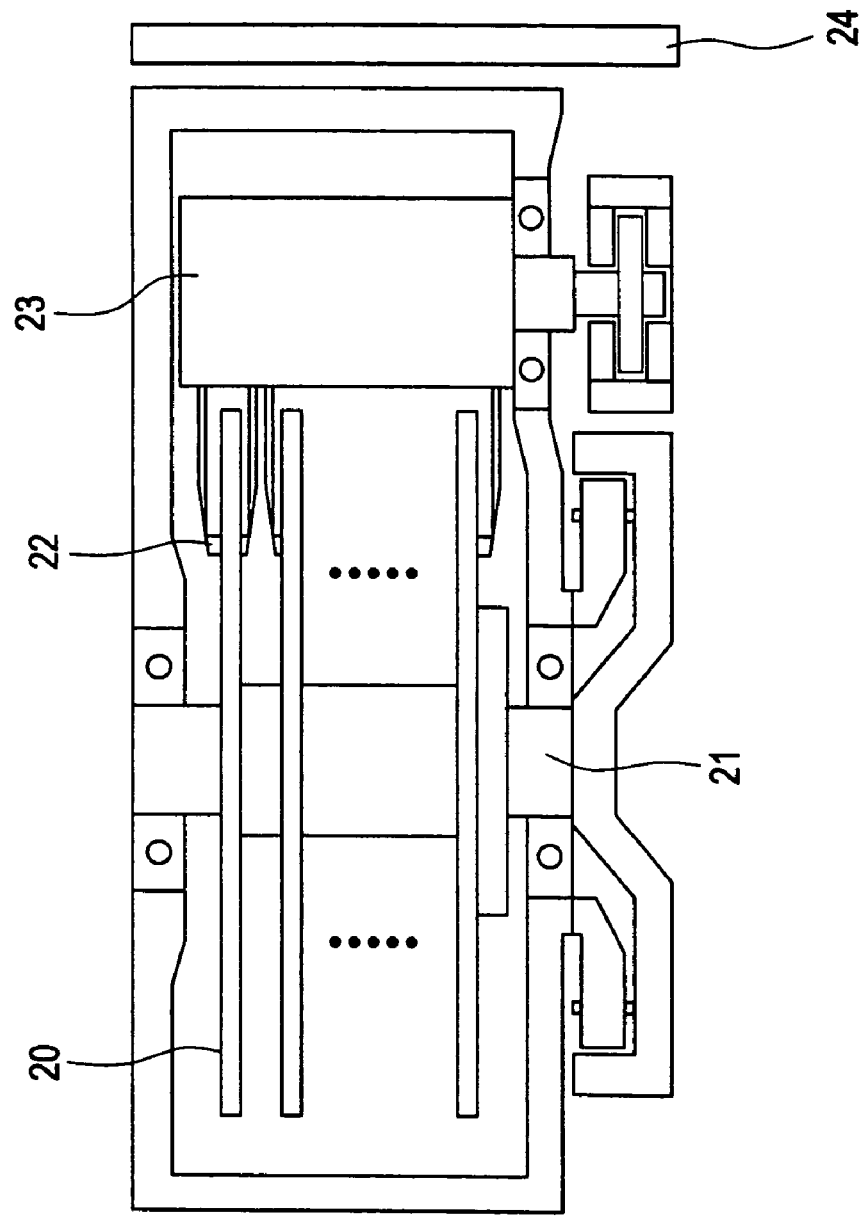

MAGNETIC RECORDING MEDIUM, PROCESS FOR PRODUCING THE SAME, AND MAGNETIC RECORDING AND REPRODUCING APPARATUS

CROSS REFERENCE

This is a Divisional Application of prior application Ser. No. 09/949,798 filed Sep. 12, 2001 now U.S. Pat. No. 6,821,653, the disclosure of which is incorporated herein by reference.

FIELD OF THE INVENTION

The present invention relates to a magnetic recording medium used in an apparatus such as a magnetic disk apparatus; a process for producing the magnetic recording medium; and a magnetic recording and reproducing apparatus. More particularly, the present invention relates to a magnetic recording medium exhibiting excellent read-write conversion characteristics.

BACKGROUND OF THE INVENTION

Recently, recording density of hard disk apparatuses, which are a type of magnetic recording and reproducing apparatus, has been increasing by 60% per year, and this trend is expected to continue in the future. Therefore, a magnetic recording head and a magnetic recording medium which are suitable for realization of high recording density have been developed.

A magnetic recording medium used in a hard disk apparatus or the like basically includes a structure as described below. On a substrate containing an Al alloy coated with Ni—P through plating or on a glass substrate, a non-magnetic undercoat layer for determining crystal orientation of a Co alloy layer is formed from Cr or a Cr alloy such as CrW or CrMo through sputtering among other methods. A thin film of Co alloy, serving as a magnetic layer, is formed on the non-magnetic undercoat layer. In addition, a protective film predominantly containing carbon is formed on the magnetic layer, and a lubricant such as perfluoropolyether is applied onto the protective film to form a lubrication film.

In accordance with an increase in recording density of an apparatus such as a magnetic disk apparatus, there has been demand for a magnetic recording medium exhibiting excellent read-write conversion characteristics. Such medium exhibits magnetic anisotropy in a circumferential direction. Therefore, a magnetic recording medium including an aluminum alloy substrate coated with an NiP film through plating (hereinafter the substrate may be referred to as an "aluminum substrate") is provided with magnetic anisotropy in a circumferential direction by forming grooves mechanically on the NiP film in a circumferential direction (hereinafter the procedure will be referred to as "mechanical texturing").

Non-magnetic substrates, for example, glass substrates have been used in magnetic recording media, because glass substrates exhibit rigidity, excellent impact resistance, and evenness. Thus, glass substrates are applicable to an increase in recording density of magnetic disk apparatuses, in which the flying height of a magnetic head is reduced. However, mechanical texturing cannot be satisfactorily carried out on a glass substrate, and thus glass substrates have been used mainly in magnetic recording media exhibiting magnetic isotropy. Even when glass substrates are subjected to texturing, satisfactory magnetic anisotropy is not obtained, and thus glass substrates have been used mainly in magnetic recording media exhibiting magnetic isotropy.

In order to solve such problems, studies have been performed on techniques for imparting magnetic anisotropy to a magnetic recording medium including a glass substrate. For example, Japanese Patent Application Laid-Open (kokai) Nos. 4-29561 and 9-167337 disclose formation of a hard film on a non-metallic substrate, which can be subjected to texturing. Japanese Patent Application Laid-Open (kokai) No. 5-197941 discloses a hard film formed through sputtering, and subjected to texturing. Japanese Patent Application Laid-Open (kokai) Nos. 4-29561 and 9-167337 disclose formation of a hard film on a non-metallic substrate, which can be subjected to texturing. However, in each of the magnetic recording media disclosed in these publications, a hard film is formed through electroless plating. Consequently, the production process for the medium includes complicated steps, resulting in high production costs. Japanese Patent Application Laid-Open (kokai) No. 5-197941 discloses an NiP hard film formed through sputtering. However, after the NiP hard film is formed through sputtering, the film must be subjected to mechanical texturing. Consequently, the production process for the magnetic recording medium disclosed in this publication includes complicated steps, resulting in high production costs. Therefore, there has been a strong demand for a production process for a magnetic anisotropic medium in which, even when a non-metallic substrate is employed, the medium is produced through a simple production process at low cost, similar to the case in which an aluminum substrate is employed.

SUMMARY OF THE INVENTION

In view of the foregoing, an object of the present invention is to provide an inexpensive magnetic recording medium exhibiting excellent read-write conversion characteristics, which includes a non-metallic substrate. The present inventors have performed extensive studies on the relation between the surface form of a magnetic recording medium and read-write characteristics of the medium suitable for realization of high recording density. The following embodiments of the present invention has been accomplished on the basis of these studies.

1) A first embodiment for solving the aforementioned problems provides a magnetic recording medium comprising a non-metallic substrate including, on its surface, texture grooves having a line density of 7,500 lines/mm or more; an orientation-determining film; a non-magnetic undercoat layer; and a magnetic layer, the film and the layers being formed on the substrate.
2) A second embodiment for solving the aforementioned problems is drawn to a specific embodiment of the magnetic recording medium according to 1), wherein the line density of the texture grooves is 15,000 lines/mm or more.
3) A third embodiment for solving the aforementioned problems is drawn to a specific embodiment of the magnetic recording medium according to 1), wherein the line density of the texture grooves is 20,000 lines/mm or more.
4) A fourth embodiment for solving the aforementioned problems is drawn to a specific embodiment of the magnetic recording medium according to any one of 1) through 3), wherein the Young's modulus of the non-metallic substrate is 70-90 GPa.
5) A fifth embodiment for solving the aforementioned problems is drawn to a specific embodiment of the magnetic recording medium according to any one of 1) through 4), wherein the micro-waviness (Wa) of the surface of the non-metallic substrate is 0.3 nm or less.

6) A sixth embodiment for solving the aforementioned problems is drawn to a specific embodiment of the magnetic recording medium according to any one of 1) through 5), wherein the arithmetic average roughness (Ra) of at least one of a cutout portion and a side edge portion constituting a chamfer section at an end portion of the non-metallic substrate is 10 nm or less.

7) A seventh embodiment for solving the aforementioned problems is drawn to a specific embodiment of the magnetic recording medium according to any one of 1) through 6), wherein the non-metallic substrate is a glass substrate.

8) An eighth embodiment for solving the aforementioned problems is drawn to a specific embodiment of the magnetic recording medium according to 7), wherein the glass substrate comprises glass ceramic.

9) A ninth embodiment for solving the aforementioned problems is drawn to a specific embodiment of the magnetic recording medium according to 8), wherein the mean size of crystal grains contained in the glass ceramic is 10-100 nm.

10) A tenth embodiment for solving the aforementioned problems is drawn to a specific embodiment of the magnetic recording medium according to 8) or 9), wherein the density of crystal grains contained in the glass ceramic is 30-5,000 grains/$\mu m^2$ at the surface of the substrate.

11) An eleventh embodiment for solving the aforementioned problems is drawn to a specific embodiment of the magnetic recording medium according to any one of 1) through 10), wherein the orientation-determining film comprises any one selected from among a Cr alloy, NiB, NiP, and NiPZ (wherein Z is one or more elements selected from among Cr, Mo, Si, Mn, W, Nb, Ti, and Zr).

12) A twelfth embodiment for solving the aforementioned problems is drawn to a specific embodiment of the magnetic recording medium according to any one of 1) through 11), wherein the surface of the orientation-determining film has been exposed to an oxygen atmosphere.

13) A thirteenth embodiment for solving the aforementioned problems is drawn to a specific embodiment of the magnetic recording medium according to any one of 1) through 12), wherein the non-magnetic undercoat layer comprises Cr or a CrX alloy (wherein X is one or more elements selected from Mo, V, and W).

14) A fourteenth embodiment for solving the aforementioned problems is drawn to a specific embodiment of the magnetic recording medium according to any one of 1) through 13), wherein the predominant crystal orientation plane of Cr or a Cr alloy contained in the non-magnetic undercoat layer is a (200) plane.

15) A fifteenth embodiment for solving the aforementioned problems is drawn to a specific embodiment of the magnetic recording medium according to any one of 1) through 14), wherein the magnetic layer comprises a CoCrPtB- or CoCrPtBY-based alloy (wherein Y is one or more elements selected from among Ta and Cu).

16) A sixteenth embodiment for solving the aforementioned problems is drawn to a specific embodiment of the magnetic recording medium according to any one of 1) through 15), wherein a non-magnetic intermediate layer is provided between the non-magnetic undercoat layer and the magnetic layer.

17) A seventeenth embodiment for solving the aforementioned problems is drawn to a specific embodiment of the magnetic recording medium according to any one of 1) through 16), wherein the magnetic anisotropic index (OR=Hc in a circumferential direction/Hc in a radial direction) of the magnetic layer is 1.05 or more.

18) An eighteenth embodiment for solving the aforementioned problems provides a process for producing a magnetic recording medium, which process comprises a texturing step for forming texture grooves having a line density of 7,500 lines/mm or more on the surface of a non-metallic substrate; and a step for forming, on the non-metallic substrate, an orientation-determining film, a non-magnetic undercoat layer, and a magnetic layer.

19) A nineteenth embodiment for solving the aforementioned problems is drawn to a specific embodiment of the production process for a magnetic recording medium according to 18), wherein the line density of the texture grooves is 15,000 lines/mm or more.

20) A twentieth embodiment for solving the aforementioned problems is drawn to a specific embodiment of the production process for a magnetic recording medium according to 18) or 19), wherein the process further comprises a step for exposing the surface of the orientation-determining film to an oxygen atmosphere after the film is formed.

21) A twenty-first embodiment for solving the aforementioned problems is drawn to a specific embodiment of the production process for a magnetic recording medium according to 20), wherein the orientation-determining film is exposed to an oxygen atmosphere without being exposed to the outside air.

22) A twenty-second embodiment for solving the aforementioned problems is drawn to a specific embodiment of the production process for a magnetic recording medium according to 20) or 21), wherein the oxygen atmosphere is an atmosphere containing oxygen gas at a pressure of $5 \times 10^{-4}$ Pa or more.

23) A twenty-third embodiment for solving the aforementioned problems provides a magnetic recording and reproducing apparatus comprising a magnetic recording medium and a magnetic head for recording data onto the medium and reproducing the data therefrom, wherein the magnetic recording medium is a magnetic recording medium as recited in any one of 1) through 17).

BRIEF DESCRIPTION OF THE DRAWINGS

FIG. 5 is a schematic representation showing an embodiment of the magnetic recording and reproducing apparatus including the magnetic recording medium shown in FIG. 1.

DESCRIPTION OF THE INVENTION

Figure 1:
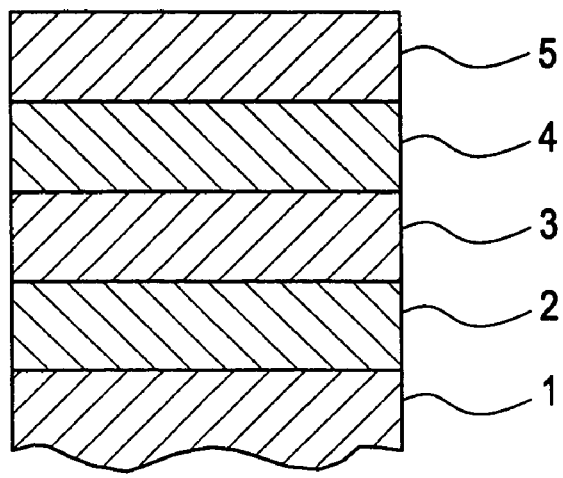
FIG. 1 is a cross-sectional view of an embodiment of the magnetic recording medium of the present invention.

FIG. 1 is a schematic representation showing an embodiment of the magnetic recording medium of the present invention. The magnetic recording medium includes a non-metallic substrate 1, an orientation-determining film 2, a non-magnetic undercoat layer 3, a magnetic layer 4, and a protective film 5, which films and layers are successively formed on the substrate 1.

The non-metallic substrate 1 is formed from a non-metallic material such as glass, ceramic, silicon, silicon carbide, carbon, or resin. Particularly, from the viewpoints of cost and durability, a glass substrate is preferably employed as the non-metallic substrate.

The glass substrate may be formed from glass ceramic or amorphous glass. The amorphous glass may be widely used soda-lime glass, aluminocate glass, or aluminosilicate glass. The glass ceramic may be lithium-based glass ceramic. Glass ceramic exhibiting excellent chemical durability is preferably employed, since such glass ceramic is applicable to various conditions that may be encountered in use. Particularly, glass ceramic containing $SiO_2$ or $Li_2O$ is preferably employed, in consideration that, when a magnetic recording medium including the glass ceramic is installed in a disk drive, the heat expansion coefficient of the medium matches that of another part in the drive, or that the medium exhibits rigidity when it is installed in the drive and practically used.

Meanwhile, a ceramic substrate may be a widely used sintered compact predominantly containing aluminum oxide, silicon nitride, or the like; or fiber-reinforced material thereof.

The surface of the non-metallic substrate includes texture grooves having a line density of 7,500 lines/mm or more. The line density is measured along a radial direction of the non-metallic substrate. The line density of the texture grooves of the surface of the non-metallic substrate is preferably 15,000 lines/mm or more, more preferably 20,000 lines/num or more. The reason why the line density is set at 7,500 lines/mm or more is that the effects of texture grooves are reflected in improvement of magnetic characteristics (e.g., enhancement of coercive force) and improvement of read-write conversion characteristics (e.g., enhancement of SNR (signal to noise ratio) or PW50).

The texture grooves are preferably present mainly in a circumferential direction of the substrate. As used herein, the term "texture grooves" refers to irregularities of the surface in which the distance between the top and the bottom of each irregularity shown in a radial cross section of the substrate is at least 0.02 nm and not greater than 10 nm (preferably at least 0.05 nm and not greater than 10 nm). When the distance falls within the above range, magnetic anisotropy attributed to the irregularities effectively enhances read-write conversion characteristics. Texture grooves having the aforementioned distance of in excess of 10 nm (i.e., large irregularities) may adversely affect uniformity of neighboring texture grooves.

In consideration of uniformity of read-write conversion characteristics and stability of head flight, the line density is preferably uniform. The CV value of the line density (average/standard deviation) is preferably 20% or less, more preferably 15% or less, much more preferably 10% or less.

The line density of texture grooves may be measured using, for example, an AFM (atomic force microscope, product of Digital Instrument).

The line density is measured under the following conditions: scan size: 3 μm, scan rate: 1 Hz, number of sample: 256, mode: tapping mode. A probe is scanned in a radial direction of a magnetic recording medium serving as a sample to obtain a scan image of AFM. A flatten order is set at 2, and plane fit auto processing, which is a type of flattening processing, is carried out with respect to the X and Y axes of the scan image to flatten the image. A box of about 0.5 μm×0.5 μm is provided on the flattened image, and the line density within a region of the box is calculated. The line density is obtained by reducing the total number of zero cross points on the X axis center line and the Y axis center line to the number of points per mm. The line density is the number of irregularities of the texture grooves per mm in a radial direction. Line densities are measured at different points on the surface of a sample (i.e., a non-metallic substrate), the average value and standard deviation of the measured densities are obtained, and the average value is regarded the line density of the texture grooves of the non-metallic substrate. The number of points at which the line density is measured is determined so that the average value and the standard deviation are obtained. For example, the number of points at which the line density is measured is 10. When the average and the standard deviation are obtained at 8 of the 10 points after excluding the point at which the line density is maximum and the point at which the line density is minimum, abnormal measurement data can be eliminated, and thus accuracy in measurement can be enhanced.

The arithmetic average surface roughness of the substrate including texture grooves is preferably at least 0.1 nm and not greater than 0.7 nm, more preferably at least 0.1 nm and not greater than 0.5 nm, much more preferably at least 0.1 nm and not greater than 0.35 nm. This is because, when the arithmetic average surface roughness of the substrate including texture grooves is large, the flying height of a magnetic head is not satisfactorily reduced; i.e., a magnetic recording medium may fail to be usable under conditions suitable for realization of high recording density.

The Young's modulus of the non-metallic substrate is preferably 70-90 GPa, more preferably 75-85 GPa, much more preferably 75-80 GPa. This is because, when the Young's modulus falls within the above range, satisfactory or uniform line density can be obtained. In order to form texture grooves on the substrate, the surface of the substrate is subjected to, for example, texturing. For example, a texturing method may be carried out, in which a polishing tape is pressed onto the surface of the substrate to thereby bring the tape into contact with the surface, a polishing slurry containing polishing grains is supplied between the tape and the substrate, and the polishing tape is moved in a tape-winding direction while the substrate is rotated. When the Young's modulus is in excess of 90 GPa, the polishing grains in the slurry do not easily adhere to the surface of the substrate, and thus workability of texturing may be impaired and satisfactory texture grooves may fail to be obtained. In contrast, when the Young's modulus is below 70 GPa, impact resistance of a magnetic recording medium, which is required when the medium is used in a magnetic recording and reproducing apparatus, may be unsatisfactory.

The Young's modulus is measured, for example, through the following procedure.

The acoustic waves (longitudinal wave, transversal wave) in the non-metallic substrate serving as a sample are measured by use of an ultrasonic wave measuring apparatus (model: 25DL, product of Panametrics), and the Young's modulus is calculated on the basis of the following formula:

$$\text{Young' modulus } (E) \text{ GPa} = \rho(3Cs^2Cp^2 - 4Cs^4)/(Cp^2 - Cs^2)$$

Cp mm/μs: longitudinal wave sonic velocity, Cs mm/μs: transversal wave sonic velocity, ρ g/cm³: density of the substrate.

When glass ceramic is used, the mean size of $SiO_2$ crystal grains in the glass ceramic is preferably 10-100 nm, more preferably 10-70 nm, much more preferably 10-50 nm. This is because, when the mean grain size is less than 10 nm, impact resistance is unsatisfactory, whereas when the mean grain size is in excess of 100 nm, workability of mechanical texturing is impaired, and satisfactory or uniform line density may fail to be obtained. From the viewpoints of rigidity and workability, the density of distribution of crystal grains on the surface of the substrate is preferably 30-5,000 grains/$\mu m^2$, more preferably 70-3,000 grains/$\mu m^2$, much more preferably 100-2,000 grains/$\mu m^2$.

The mean grain size and density of crystal grains are measured through, for example, the following procedure.

A substrate (sample) of 2 mm (length)×2 mm (width)×5 mm (thickness) is formed into a thin film through ion milling, a photograph (magnification: ×100,000) of the film is obtained by use of a plane transmission electron microscope (TEM), and the mean grain size and density are obtained from the photograph. For example, the sizes of crystal grains within a field of view are measured, and the measured data are averaged.

Texture grooves in a circumferential direction may include texture grooves obtained through application of oscillation. Texture grooves obtained through application of oscillation include texture grooves present in a direction forming a certain angle with respect to a circumferential direction of the substrate. For example, the angle may be within ±8° with respect to the tangent of a texture groove in a circumferential direction. Texture grooves obtained through application of oscillation are preferable, since flying conditions of a magnetic head become stable when a magnetic recording medium is practically used in a disk drive.

Figure 2:
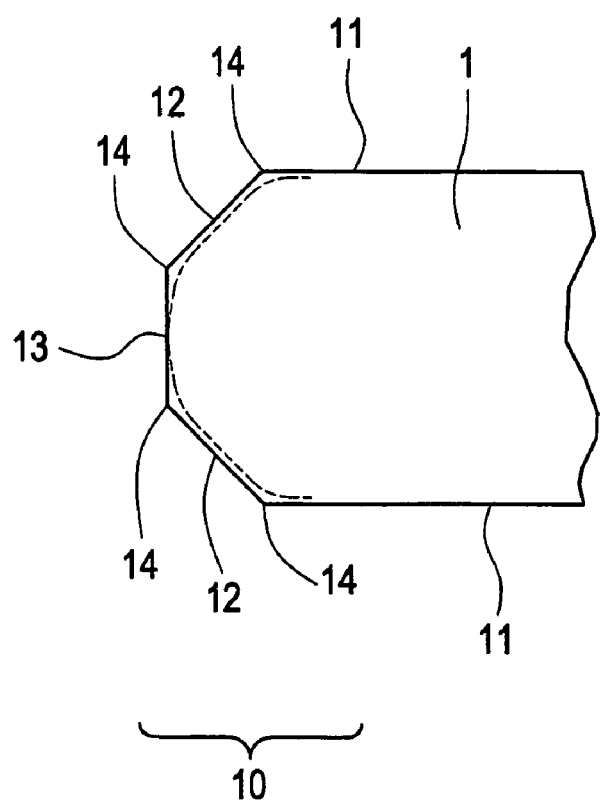
FIG. 2 is a schematic representation showing an embodiment of the chamfer section at the end portion of the non-metallic substrate of the magnetic recording medium of the present invention.

As shown in FIG. 2, a chamfer section 10 of an end portion of the non-metallic substrate 1 includes cutout portions 12 and a side edge portion 13. The arithmetic average surface roughness (Ra) of at least one of these portions is preferably 10 nm or less, more preferably 9.5 nm or less. The surface roughness (Rmax) of at least one of these portions is preferably 100 nm or less, more preferably 95 nm or less. The chamfer section also includes corner portions 14 between a surface portion 11 and the cutout portion, and between the cutout portion and the side edge portion. These corner portions preferably assume a curved form. The curved form is shown by a dashed line in FIG. 2. The radius of the curve is preferably 0.1-10 mm. When the roughness of the chamfer section of the end portion of the substrate which is subjected to texturing is large, wear powder is generated from the rough portion, and the powder invades between a polishing tape and the substrate. In this case, scratches are generated on the substrate by the action of the wear powder when the substrate is subjected to texturing. Consequently, uniformity of the thus-formed texture grooves may become unsatisfactory. The chamfer section is preferably subjected to, for example, mirror polishing.

Before formation of texture grooves, the arithmetic average surface roughness of the substrate is preferably 1.5 nm or less, more preferably 1 nm or less. For example, the surface of the substrate is preferably subjected to mirror polishing. This is because, when the arithmetic average surface roughness is in excess of 1.5 nm, flatness of the substrate is impaired, and the tape and the substrate may be inconsistently brought into contact with each other during texturing, and thus satisfactory or uniform line density may fail to be obtained.

The micro-waviness (Wa) of the surface of the substrate is preferably 0.3 nm or less, more preferably 0.25 nm or less. This is because, when the micro-waviness falls outside the above range, flatness of the substrate is impaired, and the tape and the substrate may be inconsistently brought into contact with each other during texturing, and thus satisfactory or uniform line density may fail to be obtained.

When the micro-waviness is large, the flying height of a magnetic head is not satisfactorily reduced; i.e., a magnetic recording medium may fail to be usable under conditions suitable for realization of high recording density. In addition, when the micro-waviness is large, flying of the head becomes unstable, and thus errors may be generated. The micro-waviness is measured, for example, as follows.

The micro-waviness (Wa) may be measured, for example, through the following procedure.

The surface of a sample is observed by use of an optical surface-form measuring apparatus (model: MicroXAM, product of Phase Shift) under the following conditions: object lens: ×10, intermediate lens: ×1.0, space filter: zonal filter, band-pass filter: 3-160 μm, field of view: 500×600μ. The thus-obtained arithmetic average roughness of the sample is regarded as its micro-waviness. Usually, when the micro waviness is measured, the filter wavelength is made longer than in the case in which the arithmetic average roughness is obtained.

The orientation-determining film is preferably formed from an alloy containing Cr as a primary component (i.e., the Cr content is in excess of 50 at %). The alloy preferably contains one or more elements selected from the group consisting of B, C, O, Al, Si, Ti, V, Zr, Nb, Mo, Ru, Rh, Ag, Hf, Ta, W, Re, Os, and Tr.

The orientation-determining film is preferably formed from NiB, NiP, or NiPZ (wherein Z includes one or more elements selected from the group consisting of Cr, Mo, Si, Mn, W, Nb, Ti, and Zr, and the Z content is 25 at % or less). When the P content is 20-40 at %, a magnetic recording medium exhibits more excellent magnetic characteristics (e.g., enhancement of coercive force) and read-write conversion characteristics (e.g., improvement of SNR or PW50), which is preferable. When X serving as a third element is added to the above material, a magnetic recording medium exhibiting more excellent magnetic anisotropy is easily produced, and corrosion resistance of the medium is improved, which is preferable. The thickness of the orientation-determining film is preferably 2-100 nm. This is because, when the thickness is less than 2 nm, satisfactory effects are not obtained, whereas when the thickness is in excess of 100 nm, productivity is lowered.

Figure 3:
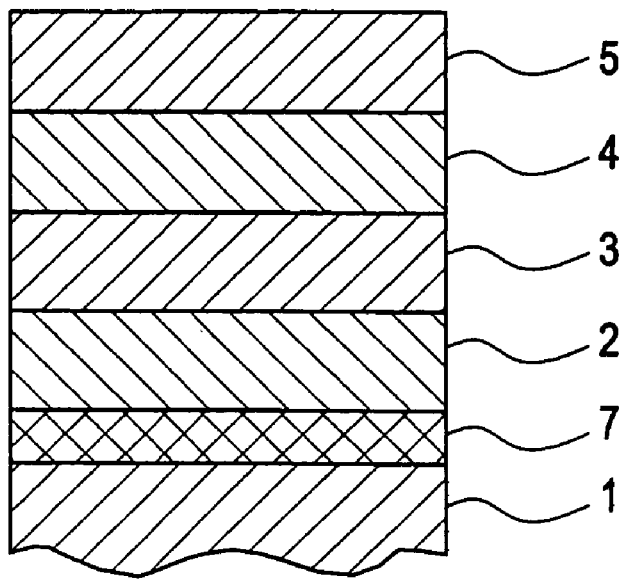
FIG. 3 is a cross-sectional view of another embodiment of the magnetic recording medium of the present invention.

In order to enhance adhesion between the substrate and the orientation-determining film, an adhesive layer may be provided between the non-metallic substrate and the orientation-determining film. The adhesive layer may be formed from any of Cr, Ti, and W. From the viewpoints of adhesion and productivity, the thickness of the adhesive layer is preferably 1-100 nm, more preferably 5-80 nm, much more preferably 7-70 nm. FIG. 3 shows the structure of a magnetic recording medium including the adhesive layer 7, as well as elements corresponding to the elements defined in FIG. 1.

The orientation-determining film is preferably exposed to an oxygen atmosphere after the film is formed, since the effect of magnetic anisotropy attributed to texture grooves is effectively obtained, and read-write conversion characteristics are enhanced.

Through component analysis, oxygen may be detected from the orientation-determining film which has been exposed to an oxygen atmosphere.

The material of the non-magnetic undercoat layer is preferably a material containing Cr or any species selected from among CrTi, CrW, CrMo, CrV, and CrSi. The thickness of the non-magnetic undercoat layer may be 5 nm or more. From an economical viewpoint of practical use, the thickness of the undercoat layer is preferably 50 nm or less. In a magnetic recording medium including the non-magnetic undercoat layer having a thickness falling within the above range, satisfactory magnetic anisotropy attributed to texture grooves is obtained. In addition, the magnetic recording medium exhibits excellent magnetic characteristics (e.g., enhancement of coercive force) and read-write conversion characteristics (e.g., enhancement of SNR), and thus the medium is suitable for realization of high recording density. The non-magnetic undercoat layer may have a multi-layer structure, and layers in the structure may be formed from a material containing any species selected from the aforementioned Cr-containing alloys. The layer provided directly on the orientation-determining film is preferably formed from Cr in order to impart satisfactory crystal orientation to the magnetic layer formed on the non-magnetic undercoat layer.

The magnetic layer may be formed from a material containing Co as a primary component. For example, the material may contain any species selected from among CoCrTa, CoCrPtTa, CoCrPtBTa, and CoCrPtBCu. For example, when CoCrPtBTa is used, the Cr content is 16-24 at %, the Pt content is 8-16 at %, the B content is 2-8 at %, and the Ta content is 1-4 at %. When CoCrPtBCu is used, the Cr content is 16-24 at %, the Pt content is 8-16 at %, the B content is 2-8 at %, and the Cu content is 1-4 at %. The thickness of the magnetic layer is preferably 15 nm or more, from the viewpoint of thermal stability. Meanwhile, in order to realize high recording density, the thickness is preferably 40 nm or less. This is because, when the thickness is in excess of 40 nm, preferable read-write conversion characteristics are not obtained. The magnetic layer may have a multi-layer structure, and layers in the structure may be formed from a material containing any species selected from the aforementioned Co-based alloys. When the magnetic layer has a multi-layer structure, the layer provided directly on the non-magnetic undercoat layer is preferably formed from CoCrPtBTa or CoCrPtBCu in order to improve SNR characteristics among read-write conversion characteristics. The outermost layer of the magnetic layer is preferably formed from CoCrPtBCu in order to improve SNR characteristics among read-write conversion characteristics.

The predominant crystal orientation plane of Cr or a Cr alloy contained in the non-magnetic undercoat layer is preferably a (200) plane. In this case, a Co alloy contained in the magnetic layer formed on the non-magnetic undercoat layer strongly exhibits a (110) crystal orientation, and therefore magnetic characteristics (e.g., coercive force) and read-write conversion characteristics (e.g., SNR) are improved.

A non-magnetic intermediate layer may be provided between the non-magnetic undercoat layer and the magnetic layer. When the intermediate layer is provided, magnetic characteristics (e.g., coercive force) and read-write conversion characteristics (e.g., SNR) are improved.

Figure 4:
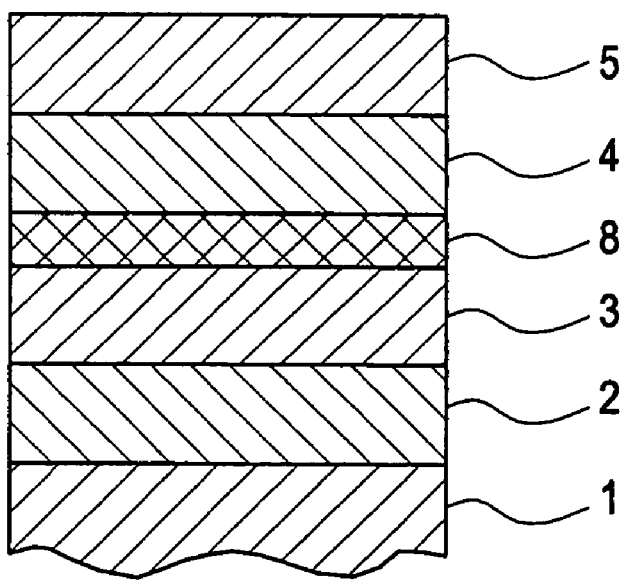
FIG. 4 is a cross-sectional view of another embodiment of the magnetic recording medium of the present invention.

The non-magnetic intermediate layer may be formed from a material containing Co and Cr. When a CoCr alloy is used as the material, the Cr content is preferably 35-45 at %. In order to improve SNR, the thickness of the non-magnetic intermediate layer is preferably 0.5-3 nm. FIG. 4 shows the structure of a magnetic recording medium including the non-magnetic intermediate layer 8, as well as elements corresponding to the elements defined in FIG. 1.

When the magnetic layer contains B, the Cr content is preferably 40 at % or less in a region at which the B content is 1 at % or more. The region is present in the vicinity of the boundary between the non-magnetic undercoat layer and the magnetic layer. This is because, when the Cr content is 40 at % or less in the region, coexistence of Cr and B in large amounts can be prevented, formation of a covalent compound from Cr and B can be suppressed to the utmost extent, and thus a deleterious effect on the crystal orientation in the magnetic layer can be prevented.

The protective film may be formed from a conventionally known material; for example, a material containing solely carbon or SiC or a material containing carbon or SiC as a primary component. In order to reduce spacing loss or to improve durability during use of a magnetic recording medium under conditions that realize high recording density, the thickness of the protective film is preferably 1-10 nm.

If necessary, a lubrication layer formed from, for example, a fluorine-containing lubricant such as perfluoropolyether may be provided on the protective film.

The magnetic layer of the magnetic recording medium of the present invention preferably has a magnetic anisotropic index (OR=Hc in a circumferential direction/Hc in a radial direction) of 1.05 or more, more preferably 1.1 or more. When the magnetic anisotropic index is 1.05 or more, magnetic characteristics (e.g., coercive force) and read-write conversion characteristics (e.g., SNR and PW50) are improved.

The magnetic recording medium of the present invention contains a non-metallic substrate including, on its surface, texture grooves having a line density of 7,500 lines/mm or more; an orientation-determining film; a non-magnetic undercoat layer; and a magnetic layer, the film and the layers being formed on the substrate. Therefore, the magnetic recording medium exhibits improved magnetic characteristics (e.g., coercive force) and enhanced read-write conversion characteristics (e.g., SNR and PW50), and thus the medium is suitable for realization of high recording density.

Since the non-metallic substrate is directly subjected to texturing without formation of a layer on the substrate to be textured, the magnetic recording medium can be produced through a production process including no step for forming a layer to be textured. Therefore, the magnetic recording medium of the present invention is inexpensive and suitable for realization of high recording density.

According to the magnetic recording medium of the present invention in which arithmetic average roughness and micro-waviness are small, read-write conversion characteristics are improved by the effect of satisfactory magnetic anisotropy. In addition, even when a magnetic head is used at a low flying height in order to reduce spacing loss, the magnetic recording medium exhibits excellent error characteristics.

FIG. 5 shows an embodiment of the magnetic recording and reproducing apparatus including the magnetic recording medium. The apparatus includes a magnetic recording medium 20, the structure of the medium being shown in FIG. 1; a medium-driving portion 21 which rotates the medium 20; a magnetic head 22, which is used for recording of data onto the medium 20 and for reproduction of the data therefrom; a head-driving portion 23 for driving the head 22 relative to the medium 20; and a recorded/reproduced signal-processing system 24. In the system 24, incoming external signals are processed and sent to the magnetic head 22, or reproduction signals from the head 22 are processed and sent to the outside. The magnetic head 22 used in the magnetic recording and reproducing apparatus may be a magnetic head suitable for high recording density and including reproduction elements such as a magnetoresistance (MR) element exerting anisotropic magnetic resistance (AMR) effect and a giant magnetoresistance (GMR) element exerting GMR effect.

The aforementioned magnetic recording and reproducing apparatus is suitable for realization of high recording density, since the apparatus employs the magnetic recording medium containing the non-metallic substrate including, on its surface, texture grooves having a line density of 7,500 lines/mm or more; the orientation-determining film; the non-magnetic undercoat layer; and the magnetic layer, the film and the layers being formed on the substrate.

The magnetic recording and reproducing apparatus of the present invention is inexpensive and suitable for realization of high recording density, since the apparatus employs the magnetic recording medium produced through a production process in which the non-metallic substrate is directly subjected to texturing without formation of a layer on the substrate to be textured.

The magnetic recording and reproducing apparatus of the present invention employs the magnetic recording medium in which arithmetic average roughness and micro-waviness are small, and thus read-write conversion characteristics are improved. In addition, even when the magnetic head is used at a low flying height in order to reduce spacing loss, the apparatus exhibits excellent error characteristics.

An embodiment of the production process of the present invention will next be described.

A non-metallic substrate may be, for example, a glass substrate, a ceramic substrate, a silicon substrate, a silicon carbide substrate, a carbon substrate, or a resin substrate. The surface of the non-metallic substrate is polished to attain an arithmetic average roughness (Ra) of preferably 1.5 nm or less, more preferably 1 nm or less. The non-metallic substrate preferably has a Young's modulus of 70-90 GPa, more preferably 75-85 GPa, much more preferably 75-80 GPa. When the non-metallic substrate is formed from glass ceramic, the mean size of crystal grains contained in the substrate is 10-100 nm, more preferably 10-70 nm, much more preferably 10-50 nm, from the viewpoints of rigidity and workability. In addition, the density of distribution of crystal grains on the surface of the substrate is preferably 30-5,000 grains/μm², more preferably 70-3,000 grains/μm², much more preferably 100-2,000 grains/μm², from the viewpoints of rigidity and workability.

The micro-waviness (Wa) of the surface of the substrate is preferably 0.3 nm or less, more preferably 0.25 nm or less. The arithmetic average surface roughness (Ra) of at least one of a cutout portion and a side edge portion constituting a chamfer section of an end portion of the substrate is preferably 10 nm or less, more preferably 9.5 nm or less.

Firstly, the surface of the non-metallic substrate is subjected to texturing, to form, texture grooves having a line density of 7,500 lines/mm or more on the surface.

For example, in order to form texture grooves having a line density of 7,500 lines/mm or more on the surface of the non-metallic substrate, the surface is subjected to mechanical texturing in a circumferential direction of the substrate using fixed polishing grains and/or free polishing grains. For example, texturing is carried out according to the following procedure: a polishing tape is pressed onto the surface of the substrate to thereby bring the tape into contact with the surface, a polishing slurry containing polishing grains is supplied between the tape and the substrate, and the polishing tape is moved in a tape-winding direction while the substrate is rotated. The substrate may be rotated at 200-1,000 rpm. The polishing slurry may be supplied at a rate of 10-50 ml/minute. The polishing tape may be moved at a rate of 1.5-15 mm/minute. The size of polishing grains contained in the polishing slurry may be 0.05-0.3 μm at D90. The D90 value indicates a particle size when the cumulative % by mass corresponds to 90% by mass. The polishing tape may be pressed onto the substrate at a force of 1-15 kgf. These conditions are appropriately determined to form texture grooves having a line density of preferably 7,500 lines/mm or more, more preferably 15,000 lines/mm or more, much more preferably 20,000 lines/mm or more.

The substrate is subjected to texturing so that the arithmetic average surface roughness of the substrate having texture grooves is preferably at least 0.1 nm and not greater than 0.7 nm, more preferably at least 0.1 nm and not greater than 0.5 nm, much more preferably at least 0.1 nm and not greater than 0.35 nm.

The non-metallic substrate may be subjected to texturing including oscillation. As used herein, the term "oscillation" refers to an operation in which the polishing tape is vibrated in a radial direction of the substrate while the tape is moved in a circumferential direction of the substrate. The oscillation is preferably carried out at a rate of 60-1,200 times/minute.

Texturing may be carried out by means of a method for forming texture grooves having a line density of 7,500 lines/mm or more. In addition to the aforementioned mechanical texturing method, a method in which fixed polishing grains are used, a method in which fixed polishing stones are used, or a method employing laser machining may be carried out.

After completion of texturing, the resultant substrate is washed. Subsequently, on the substrate, an orientation-determining film having a thickness of 2-100 nm is formed through, for example, sputtering by use of a sputtering target containing a material of the film. The sputtering target preferably contains an alloy containing Cr as a primary component (i.e., the Cr content is in excess of 50 at %). The alloy preferably contains, as other components, one or more elements selected from among B, C, O, Al, Si, Ti, V, Zr, Nb, Mo, Ru, Rh, Ag, Hf, Ta, W, Re, Os, and Tr. The sputtering target preferably contains, as a raw material, NiB, NiP, or NiPZ (wherein Z includes one or more elements selected from among Cr, Mo, Si, Mn, W, Nb, Ti, and Zr, and the Z content is 25 at % or less). The P content is preferably 20-40 at %. Sputtering for forming the film is carried out, for example, under the following conditions. A chamber in which the film is formed is evacuated to $10^{-4}$ to $10^{-7}$ Pa. The substrate is placed in the chamber, Ar gas is introduced into the chamber, and discharge is carried out to form a film through sputtering. During sputtering, power of 0.2-2.0 kW is supplied. A desired film thickness can be attained by regulating discharge time and power which is supplied.

During formation of the orientation-determining film, when particles of a material of the film are released from a release source and deposited onto the non-metallic substrate, the direction of the particles is preferably determined so that the trajectory of the particles is projected onto the substrate in a radial direction of the substrate, and the particles are impinged at a certain incident angle with respect to the substrate. The direction of the particles is preferably determined so that the incident angle of the particles becomes 10-75° with respect to the normal of the surface of the non-metallic substrate. This is because the orientation-determining film effectively exerts its effects.

When an adhesive layer is formed between the non-metallic substrate and the orientation-determining film in order to enhance adhesion therebetween, the adhesive layer having a thickness of 1-100 nm is formed through sputtering by use of a sputtering target containing a material of the adhesive layer before formation of the orientation-determining film, in a manner similar to that for the orientation-determining film. The sputtering target may contain as a raw material any species selected from among Cr, Ti, and W.

After formation of the orientation-determining film, the surface of the film is preferably exposed to an oxygen atmosphere. When the surface is exposed to an oxygen atmosphere, magnetic anisotropy attributed to texture grooves is effectively obtained, which is preferable. The oxygen atmosphere to which the surface is exposed is preferably an atmosphere containing oxygen gas at a pressure of $5\times10^{-4}$ Pa or more. The atmosphere for exposure may be brought into contact with water. The exposure time is preferably 0.5-15 seconds. For example, after the orientation-determining film is formed, the film is removed from the chamber, and then exposed to the outside air or an oxygen atmosphere. Alternatively, without removal of the film from the chamber, air or oxygen is introduced into the chamber, and the film is exposed thereto. Particularly, when the film is exposed to an oxygen atmosphere in the chamber, a cumbersome step (i.e., removal of the film from the evacuated chamber) is omitted, and thus the orientation-determining film, and the below-described non-magnetic undercoat layer and magnetic layer are continuously formed in a series of film formation, which is preferable. When the film is exposed to an oxygen atmosphere in the chamber, preferably, the chamber is evacuated to $10^{-6}$ Pa or less and the atmosphere preferably contains oxygen gas at a pressure of $5\times10^{-4}$ Pa or more.

On the orientation-determining film, a non-magnetic undercoat layer having a thickness of 5-50 nm is formed through sputtering by use of a sputtering target containing a material of the non-magnetic undercoat layer in a manner similar to that of the orientation-determining film. The sputtering target may contain as a raw material any species selected from among CrTi, CrW, CrMo, CrV, and CrSi.

After formation of the non-magnetic undercoat layer, a magnetic layer having a thickness of 15-40 nm is formed through sputtering by use of a sputtering target containing a material of the magnetic layer in a manner similar to that of the non-magnetic undercoat layer. The sputtering target may contain as a raw material any species selected from among CoCrTa, CoCrPtTa, CoCrPtBTa, and CoCrPtBCu. For example, when CoCrPtBTa is used, the Cr content is 16-24 at %, the Pt content is 8-16 at %, the B content is 2-8 at %, and the Ta content is 1-4 at %. When CoCrPtBCu is used, the Cr content is 16-24 at %, the Pt content is 8-16 at %, the B content is 2-8 at %, and the Cu content is 1-4 at %.

The orientation-determining layer is preferably formed so that the predominant crystal orientation plane of Cr or a Cr alloy contained in the non-magnetic undercoat layer is a (200) plane.

The respective film and layers are formed so that the magnetic anisotropic index (OR=Hc in a circumferential direction/Hc in a radial direction) of the magnetic layer is preferably 1.05 or more, preferably 1.1 or more.

After formation of the magnetic layer, a protective film predominantly containing carbon is formed through a known technique, such as sputtering, plasma CVD, or a combination thereof.

If necessary, a fluorine-containing lubricant such as perfluoropolyether is applied onto the protective film through dipping or spin coating to form a lubrication film.

The magnetic recording medium produced according to the present invention contains the non-metallic substrate including, on its surface, texture grooves having a line density of 7,500 lines/mm or more; the orientation-determining film; the non-magnetic undercoat layer; and the magnetic layer, the film and the layers being formed on the substrate. Therefore, the magnetic recording medium exhibits improved magnetic characteristics (e.g., coercive force) and enhanced read-write conversion characteristics (e.g., SNR and PW50), and thus the medium is suitable for realization of high recording density.

Since the non-metallic substrate is directly subjected to texturing without formation of a layer on the substrate to be textured, the magnetic recording medium is produced through a production process including no step for forming a layer to be textured. Therefore, the magnetic recording medium produced according to the present invention is inexpensive and suitable for realization of high recording density.

EXAMPLES

The effects of the present invention will next be described in more detail by way of examples. The Examples are not intended to limit the scope of the present invention, and should not be construed as doing so. Unless indicated otherwise, all parts, percents, ratios and the like are by weight.

Example 1

A magnetic recording medium similar to that shown in FIG. 1 was produced as follows.

A glass ceramic substrate (diameter: 65 mm, thickness: 0.635 mm) was used as a non-metallic substrate. The arithmetic average surface roughness of the substrate was 0.3 nm. Table 1 shows the Young's modulus of the glass ceramic substrate; the mean size of crystal grains contained in the glass ceramic substrate; the arithmetic average roughness of a cutout portion and a side edge portion constituting a chamfer section at an end portion of the substrate; and the micro-waviness of the substrate.

The glass ceramic substrate serving as a non-metallic substrate was subjected to mechanical texturing, so as to attain an arithmetic average surface roughness (Ra) of 5 Å and a line density shown in Table 1 (the surface roughness was measured by use of an AFM (product of Degital Instrument)). Diamond polishing grains having a size of 0.3 µm at D90 were used in a polishing slurry. The substrate (i.e., disk) was rotated at 700 rpm. A polishing tape was moved at a rate of 3.0 mm/second, and vibrated at a rate of 600 times/minute.

After the resultant substrate was completely washed and dried, the substrate was placed in a chamber of a DC magnetron sputtering apparatus (model: 3010, product of ANELVA). Subsequently, the chamber was evacuated to $2\times10^{-7}$ Pa, and sputtering was carried out by use of a sputtering target containing NiP (P content: 20 at %) to form an orientation-determining film 2 having a thickness of 30 nm on the substrate 1. Thereafter, oxygen was introduced into the chamber to attain a pressure of $5\times10^{-4}$ Pa, and the surface of the orientation-determining film was exposed to the oxygen atmosphere for 11 seconds.

Subsequently, the chamber was evacuated again, and then the substrate including the orientation-determining film was heated to 200° C. Thereafter, a non-magnetic undercoat layer 3 having a thickness of 10 nm and a magnetic layer 4 having a thickness of 25 nm were formed by use of a sputtering target containing Cr and a sputtering target containing CoCrPtB (Cr content: 21 at %, Pt content: 10 at %, B content: 2 at %), respectively. A protective film was formed through sputtering by use of carbon to attain a thickness of 5 nm.

On the carbon protective film 5, a perfluoropolyether lubrication film having a thickness of 2 nm was formed through dipping.

Comparative Examples 1 and 2

The procedure of Example 1 was repeated, except that conditions in relation to the substrate, such as line density and Young's modulus, were changed as shown in Table 1 to produce a magnetic recording medium.

Examples 2 through 6

The procedure of Example 1 was repeated, except that conditions in relation to the substrate, such as line density and Young's modulus, were changed as shown in Table 1 to produce a magnetic recording medium.

Examples 7 through 11

The procedure of Example 1 was repeated, except that a chemically reinforced glass substrate containing no crystal grains was used as a non-metallic substrate, and that conditions in relation to the substrate, such as line density and Young's modulus, were changed as shown in Table 1 to produce a magnetic recording medium.

Examples 12 and 13

The procedure of Example 1 was repeated, except that the micro-waviness and the roughness of the chamfer section were changed as shown in Table 1 to produce a magnetic recording medium.

Example 14

The procedure of Example 1 was repeated, except that the orientation-determining film was formed from Cr30Nb (Nb content 30 at %), and that the film was not exposed to an oxygen atmosphere to produce a magnetic recording medium.

Magnetostatic characteristics of the magnetic recording medium of each of the Examples and Comparative Examples were measured using a vibrating sample magnetometer (VSM). Magnetic anisotropic index (OR) was obtained from the following formula: OR=Hc in a circumferential direction/Hc in a radial direction. The arithmetic average roughness (Ra) of the glass substrate and the line density of texture grooves were measured in a field of view of 1 μm by use of an AFM (product of Digital Instrument). The number of scratches generated on the medium was observed under an optical microscope (magnification: ×240) to count scratches per surface.

Read-write conversion characteristics of each magnetic recording medium were measured using read/write analyzer RWA1632 and spin stand S1701MP (products of GUZIK). In order to evaluate read-write conversion characteristics, measurement was performed using, a complex-type thin film magnetic recording head containing a giant magnetoresistive (GMR) element, as a magnetic head, at the reproduction portion, and track-recording density was set at 350 kFCI.

Table 2 shows the magnetic anisotropic index (OR), magnetostatic characteristics, read-write conversion characteristics (i.e., half power width of output peak (PW50) and SNR), and error characteristics of the magnetic recording medium of each of the Examples and Comparative Examples; as well as the number of scratches generated on the medium.

In each Example or Comparative Example, the non-magnetic undercoat layer was subjected to X-ray diffraction, and the predominant crystal orientation plane of Cr or an Cr alloy contained in the layer was verified to be a (200) plane.

TABLE 1

|  | Average line density (lines/mm) | Line density CV value (%) | Young's modulus (Gpa) | Mean crystal grain size (nm) | Micro-waviness (nm) | Roughness of cutout portion Ra (nm) | Roughness of side edge portion Ra (nm) | OR |
|---|---|---|---|---|---|---|---|---|
| Ex. 1 | 24500 | 12 | 79 | 50 | 0.22 | 9.8 | 9.9 | 1.25 |
| Ex. 2 | 15300 | 10 | 83 | 60 | 0.24 | 9.5 | 9.6 | 1.20 |
| Ex. 3 | 12800 | 8 | 82 | 70 | 0.21 | 7.2 | 8.4 | 1.10 |
| Ex. 4 | 12100 | 12 | 86 | 75 | 0.24 | 7.8 | 7.5 | 1.11 |
| Ex. 5 | 8400 | 8 | 83 | 83 | 0.27 | 7.8 | 8.1 | 1.09 |
| Ex. 6 | 7500 | 7 | 90 | 81 | 0.22 | 8.8 | 9.1 | 1.05 |
| Comp. Ex. 1 | 3300 | 22 | 95 | 100 | 0.24 | 9 | 8.7 | 1.00 |
| Comp. Ex. 2 | 1800 | 20 | 100 | 150 | 0.22 | 30 | 29 | 1.00 |
| Ex. 7 | 24600 | 15 | 75 | — | 0.26 | 10 | 9.7 | 1.24 |
| Ex. 8 | 16500 | 9 | 82 | — | 0.25 | 8.5 | 8.2 | 1.19 |
| Ex. 9 | 16300 | 15 | 83 | — | 0.27 | 8.2 | 7.9 | 1.11 |
| Ex. 10 | 10400 | 7 | 86 | — | 0.25 | 9.2 | 10.1 | 1.09 |
| Ex. 11 | 9200 | 8 | 88 | — | 0.28 | 7.8 | 7.5 | 1.06 |
| Ex. 12 | 24500 | 13 | 80 | 45 | 0.44 | 9.5 | 9.8 | 1.23 |
| Ex. 13 | 24200 | 15 | 80 | 49 | 0.23 | 30 | 29 | 1.24 |
| Ex. 14 | 24500 | 12 | 79 | 50 | 0.22 | 9.8 | 9.9 | 1.28 |

TABLE 2

|  | Hc (circumferential direction) (Oe) | PW50 (ns) | SNR (dB) | Error characteristic "X" of 10exp(x) | Number of scratches |
|---|---|---|---|---|---|
| Ex. 1 | 3600 | 11.0 | 24.6 | −7.6 | ○ |
| Ex. 2 | 3500 | 11.2 | 24.1 | −7.2 | ○ |
| Ex. 3 | 3450 | 11.4 | 23.6 | −7.1 | ○○ |
| Ex. 4 | 3420 | 11.6 | 23.8 | −6.2 | ○○ |
| Ex. 5 | 3390 | 11.7 | 23.7 | −6.0 | ○○ |
| Ex. 6 | 3300 | 12.2 | 23.5 | −5.8 | ○○ |
| Comp. Ex. 1 | 3100 | 13.4 | 21.1 | −4.4 | ○○ |
| Comp. Ex. 2 | 2900 | 13.3 | 21.4 | >−3.0 | Δ |
| Ex. 7 | 3610 | 10.9 | 24.6 | −7.5 | ΔΔ |
| Ex. 8 | 3520 | 11.2 | 23.9 | −7.3 | ○○ |
| Ex. 9 | 3490 | 11.3 | 23.7 | −7.0 | ○○ |
| Ex. 10 | 3490 | 11.4 | 23.6 | −6.1 | ΔΔ |
| Ex. 11 | 3350 | 11.8 | 23.6 | −5.9 | ○○ |
| Ex. 12 | 3600 | 11.0 | 24.6 | −5.0 | ○ |
| Ex. 13 | 3610 | 11.1 | 24.4 | −7.7 | Δ |
| Ex. 14 | 3570 | 11.0 | 24.3 | −7.6 | ○ |

Number of scratches
○○: less than 10 per surface
○: 10–50 per surface
Δ: 51–75 per surface
ΔΔ: 76–100 per surface The magnetic recording medium of the present invention contains a non-metallic substrate including, on its surface, texture grooves having a line density of 7,500 lines/mm or more; an orientation-determining film; a non-magnetic undercoat layer; and a magnetic layer, the film and the layers being formed on the substrate. Therefore, the magnetic recording medium exhibits improved magnetic characteristics (e.g., coercive force) and enhanced read-write conversion characteristics (e.g., SNR and PW50), and thus the medium is suitable for realization of high recording density.

Since the non-metallic substrate is directly subjected to texturing without formation of a layer on the substrate to be textured, the magnetic recording medium is produced through a production process including no step for forming a layer to be textured. Therefore, the magnetic recording medium is inexpensive and suitable for realization of high recording density.

According to the production process of the present invention, there is produced a magnetic recording medium containing a non-metallic substrate including, on its surface, texture grooves having a line density of 7,500 lines/mm or more; an orientation-determining film; a non-magnetic undercoat layer; and a magnetic layer, the film and the layers being formed on the substrate. The magnetic recording medium exhibits improved magnetic characteristics (e.g., coercive force) and enhanced read-write conversion characteristics (e.g., SNR and PW50). According to the production process, a magnetic recording medium suitable for realization of high recording density can be produced.

Since the non-metallic substrate is directly subjected to texturing without formation of a layer on the substrate to be textured, a magnetic recording medium is produced through a production process including no step for forming a layer to be textured. Therefore, according to the production process, a magnetic recording medium which is inexpensive and suitable for realization of high recording density can be produced.

The magnetic recording and reproducing apparatus of the present invention is inexpensive and suitable for realization of high recording density, since the apparatus employs the aforementioned magnetic recording medium.

While the invention has been described in detail and with reference to specific embodiments thereof, it will be apparent to one skilled in the art that various changes and modifications can be made therein without departing from the spirit and scope thereof.

What is claimed is:

1. A process for producing a magnetic recording medium, which process comprises:
    a texturing step for forming texture grooves having a line density of 7,500 lines/mm or more on the surface of a non-metallic substrate;
    a step for forming an orientation-determining film, a non-magnetic undercoat layer, and a magnetic layer on the non-metallic substrate; and
    a step of exposing the surface of the orientation-determining film to an oxygen atmosphere after the film is formed.

2. A process for producing a magnetic recording medium according to claim 1, wherein the texture grooves have a line density of 15,000 lines/mm or more.

3. A process for producing a magnetic recording medium according to claim 1 wherein the orientation-determining film is exposed to an oxygen atmosphere without being exposed to outside air.

4. A process for producing a magnetic recording medium according to claim 1, wherein the oxygen atmosphere is an atmosphere containing oxygen gas at a pressure of $5 \times 10^{-4}$ Pa or more.

* * * * *